United States Patent [19]

Thyselius

[11] 4,160,951
[45] Jul. 10, 1979

[54] METHOD OF REGENERATING ASYNCHRONOUS DATA SIGNALS AND APPARATUS FOR PERFORMING THE METHOD

[75] Inventor: Per-Olov Thyselius, Tyreso, Sweden

[73] Assignee: Telefonaktiebolaget L M Ericsson, Stockholm, Sweden

[21] Appl. No.: 829,481

[22] Filed: Aug. 31, 1977

[30] Foreign Application Priority Data

Sep. 15, 1976 [SE] Sweden ............................ 7610212

[51] Int. Cl.$^2$ ............................................ H04L 25/20
[52] U.S. Cl. ........................................ 325/13; 328/164
[58] Field of Search ............. 325/6.13, 66; 178/70 R, 178/70 T, 70 TS, 70 S, 69.1; 328/162, 164, 120; 364/112; 360/39; 179/15 AC, 15 AQ, 15 A, 15 AF

[56] References Cited

U.S. PATENT DOCUMENTS

| | | | |
|---|---|---|---|
| 3,626,095 | 12/1971 | Nakagome | 178/70 R |
| 3,772,596 | 11/1973 | Edwards | 325/6 |
| 4,007,329 | 2/1977 | McClain et al. | 178/70 R |

*Primary Examiner*—Benedict V. Safourek
*Attorney, Agent, or Firm*—Hane, Roberts, Spiecens & Cohen

[57] ABSTRACT

A method and a device is described for the regeneration of asynchronous data signals of a given character structure which arrive on a transmission line time distorted and at a signalling rate which deviates from the nominal signalling rate and after detection are fed to a regeneration device at a character rate determined by the arriving data signals, the data signals then being retransmitted at a signalling rate determined by a timing generator included in the regeneration device. In order to reduce variations in character length of the retransmitted data signals, at least part of the characters fed to the regeneration device are stored temporarily while a preceding character is being retransmitted, and the length of a retransmitted character is shortened in dependence upon the separation in time between the beginning of a character fed to the regeneration device and the expected ending of a character in progress of retransmission, the degree of the shortening being determined by the relation of the time separation to a definite time limit.

7 Claims, 10 Drawing Figures

METHOD OF REGENERATING ASYNCHRONOUS DATA SIGNALS AND APPARATUS FOR PERFORMING THE METHOD

BACKGROUND OF THE INVENTION

This invention pertains to a method and an apparatus for the regeneration of asynchronous data signals of a given character structure which arrive on a transmission line time distorted and at a signalling rate which deviates from the nominal signalling rate and after detection are fed, at a character rate determined by the arriving signals, to a regeneration device which retransmits the data signals at a signalling rate determined by a timing generator included in the regeneration device.

In the Swedish published application No. 7310969-6 a simple regeneration principle is described according to which the asynchronous data signals after detection are retransmitted at the same instantaneous character rate as they are received, i.e. with a constant character delay. The time position of an arriving character is established by means of the opening start element which, due to the rate deviation and time distorsion being present, will be more or less displaced compared to its nominal time position. If the start element and the subsequent data elements are retransmitted with equal lengths the finishing stop element will be of a varying length in correspondence with the above mentioned time position displacements. When transmitting over long distances the data signals may have to pass several regenerators and there is a risk, then, that the stop elements may be exposed to such a great distorsion that the following start elements cannot be detected and data loss arises. In order to avoid that, it is necessary during the regeneration also to observe the stop element so that its length will be as constant as possible and, consequently, the regenerated character length be adjusted to the incoming average character rate. This is achieved, according to the invention, in such a way that the retransmission of characters is effected with a varying delay which is adjusted depending on the deviation of the arriving characters from their nominal time positions. The characteristics of the invention appear from the claims.

DESCRIPTION OF THE DRAWING

The invention will be described by the aid of an embodiment with reference to the appended drawing where.

Figure 1:
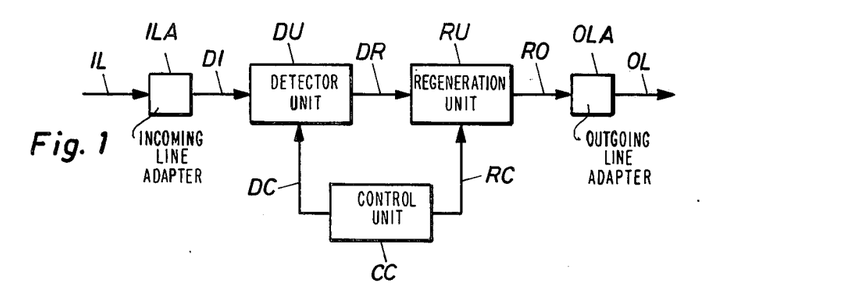
FIG. 1 is a block diagram of regenerator example.

The block diagram in FIG. 1 comprises an incoming line adapter ILA, a detector unit DU, a regeneration unit RU, an outgoing line adapter OLA and a control unit CC. On the line IL asynchronous data signals are arrive at the adapter ILA where a signal conversion is made from the form which is used on the transmission medium to a form which can be handled by the following units. The signals are transmitted via the path DI to the detector unit DU, which establishes the binary information contents of the signals and then forwards the information to he regeneration unit RU via the path DR. From the regeneration unit, finally, the data signals are transmitted via the path RO to the adapter OLA where a new signal conversion is made before the signals are sent to the line OL. Both the signal detection and the signal regeneration are controlled from the common control unit CC by means of timing signals on the paths DC and RC, respectively. It is assumed that the detector works according to the principle which is described in the Swedish published application No. 7310960-6. Thus, the arriving data signals are sensed with a sampling frequency which is 15 times higher than the nominal signalling rate of the data signals which implies that a signal element of a nominal length, at TELEX-signalling 20 ms, is sensed 15 times. With the aid of the obtained sampling values, first the occurrence of a start element in identified and then indication signals related to the binary values of the respective character elements are emitted every fifteenth sampling pulse. The regeneration principle which is described in the same published application implies that the indication signals being emitted by the detector control a bistable flip-flop which consequently reestablished the signal elements with a length determined by the distance between the indication signals.

In TELEX-signalling the characters consist of a start element and five data elements having the nominal length of 20 ms (=one unit interval) and a stop element having a nominal length of 30 ms (=one and a half unit intervals). The length of the stop element is relevant for the case when the characters are emitted without intervals, which is the case when sending automatically from a paper tape reader. As a matter of course, when sending manually from a keyboard the intervals between the characters can be longer, which implies a corresponding extension of the stop element. In line a in FIG. 2 a character sequence consisting of the beginning of the word TELEX following after a long interval with stop polarity is shown. In line b the same sequence is shown such as it might appear on the incoming line IL in FIG. 1 after having been exposed to distorsion. In the detector unit DU the leading edge of each received start element is identified, which is symbolized by the unbroken pulses in line c in FIG. 2. The dotted pulses mark the instants at which the detector emits its indication signals on path DR, according to the above after every fifteenth sampling interval.

In line d the emitted indication signals are shown, a high pulse amplitude marking the start polarity and a low pulse amplitude marking the stop polarity. If the regeneration is made in the simple way mentioned above the character sequence emitted to the outgoing line OL will look as is shown in line e in FIG. 2. It is obvious that the stop elements vary in length; in the character "T" the length is only one unit element. In order to cure this situation it is necessary to complete the regeneration unit RU with an intermediate buffer store by the aid of which the indication signals belonging to a character can be delayed as long as required to make it possible to retransmit the previous character with the desired character length. This delay is illustrated in line f where each emitted character has been given the nominal length D (=150 ms). According to the shown embodiment a certain equalization of the delays has taken place so that when the transmission of the character "L" is complete only a small part of the buffer capacity has been utilized. In unfavorable cases, however, due to rate deviation between arriving and retransmitted characters, the buffer will gradually be filled to its upper limit, as a consequence of which the regenerator has to pass on to retransmitting the characters with the same length as they had when they arrived. Consequently, the equalizing effect is lost and has been replaced by a constant additional delay.

According to the invention, the above mentioned problem is solved in such a way that the regenerator unit, in addition to the described intermediate buffer store, is provided with devices for adjusting the length of the retransmitted stop element according to the filling degree of the buffer. In the lines g, h and i, j respectively in FIG. 2 two principles of performing such an adjustment have been illustrated. The pulses in the lines g and i symbolize read pulses by means of which the indication values are taken from the buffer and fed to the regeneration flip-flop. The retransmitted signals are shown in the lines h and j, respectively. According to both principles, a determination is made for each retransmitted character of the time distance between the read pulse belonging to the stop element in the retransmitted character and the first indication signal belonging to the next detected character, i.e. the signal indicating the next start element, from the detector DU. In the lines g and i these time distances have been designated $f_1$, $f_2$, $f_3$ and $f_4$. Then an adjustment of the length of the stop element is made depending on the size of the time distance in such a way that the stop element is more or less shortened depending on the closeness of the time distance to a certain lower limit which is determined by the buffer capacity. The adjustment instant, however, is chosen differently in relation to the measurement instant for the two principles.

Figure 2:
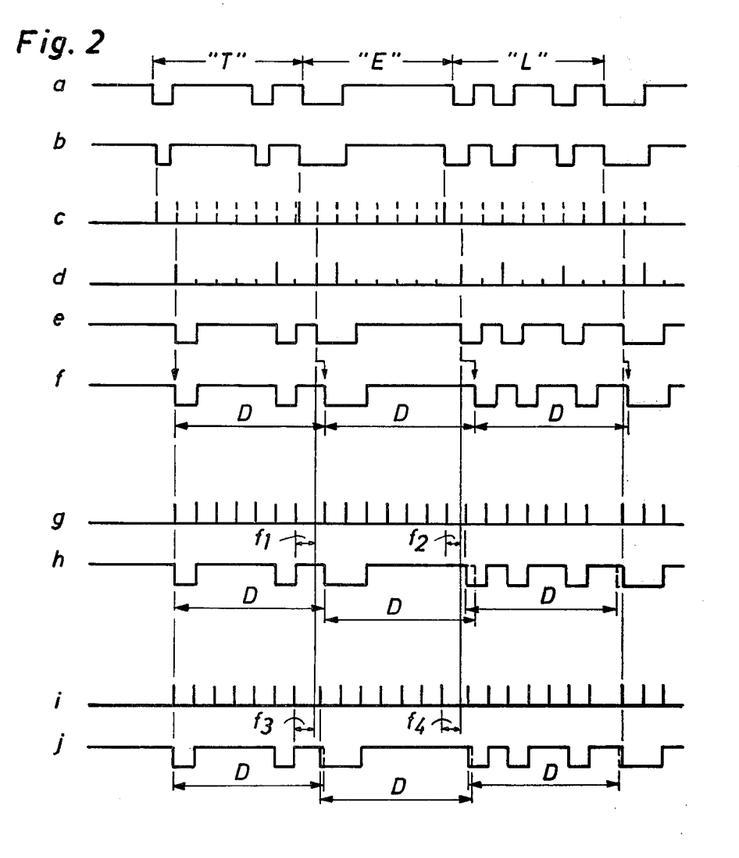
FIG. 2 is a time diagram relating to the arrangement according to FIG. 1.

According to the principle described in the lines g, h the adjustment is made on the character following the respective measurement. Thus the first measured time distance $f_1$ does not cause any adjustment of the character "T" which is retransmitted with the nominal length D. Instead the character "E" is shortened according to a determined strategy which must consider that the next following character ("L") may require longer storage time. The mesurement of the time distance $f_2$ also shows that this is the case, but fortunately the indication signal for the next start element appears at such a great time distance that storage becomes unnecessary and the stop element of the character "L" is even retransmitted with a length exceeding the nominal length. The principle described here is simple to perform in practice as the shortening of a stop element can be made at a determined, suitably chosen time, for example at the beginning of the stop element. On the other hand the adjustments will be so much delayed that a certain over-compensation cannot be avoided, which also appears from the shown example.

Figure 3:
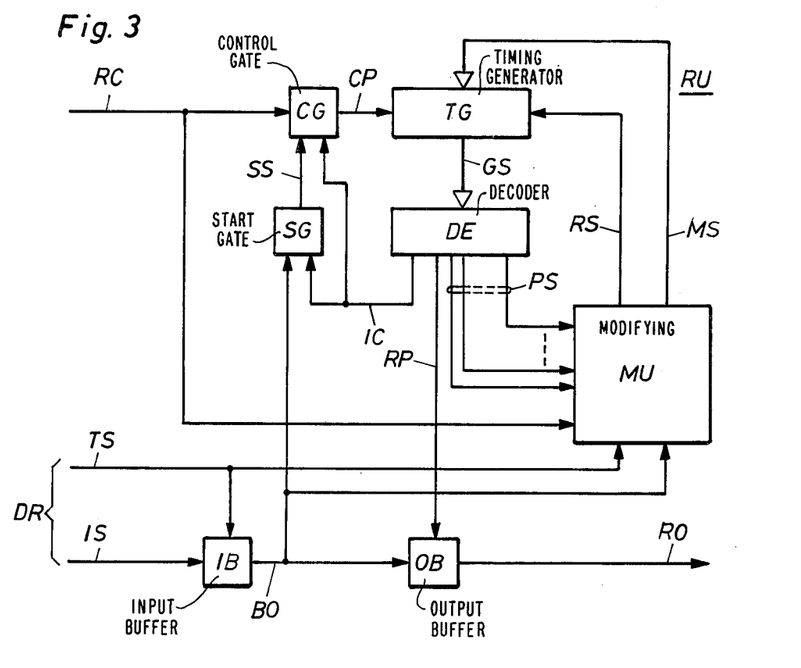
FIG. 3 is a block diagram showing an embodiment of the regenerator.

According to the principle which is illustrated in the lines i, j in FIG. 2 an adjustment is made, when necessary, of the length of the stop element which is being retransmitting when the measurement of the time distance is made. Thus the character "T" is shortened depending on the time distance $f_3$ and the character "E" depending on the time distance $f_4$. In such a way the over-compensation is reduced and the variation of lengths of the regenerated characters will be smaller than according to the previous principle. The practical implementation, however, will be somewhat more complicated as the shortening of a stop element cannot be made at a fixed time but only when the measurement of the time distance has been made, i.e. in connection with the occurrence of the indication signal for the following start element, at the earliest. FIG. 3 is an embodiment of how the regeneration unit RU can be constructed. The path DR from the detector unit DU in FIG. 1 comprises two lines IS, TS, the former of which provides the unit with data signals in the form of indication signals indicating start polarity or stop polarity of the detected character elements while the latter provides the unit with simultaneous element timing signals by means of which the data signals are stored, one at a time, in an input buffer IB. The stored data signal is available on an output BO and can be read out to an output buffer OB for retransmission via the path RO to the line adapter OLA in FIG. 1. The reading is made by means of read pulses which are supplied to the output buffer OB on a line RP at character element rate. The path RC from the common control unit CC in FIG. 1 transmits timing signals for control of the unit RU. According to the previously described example it is assumed that the timing signal frequency is 15 times the data signalling rate, i.e. the element rate. The path RC is connected to a control gate CG which, under the control of a start signal on a line SS and an idle signal on a line IC, emits clock pulses CP to a cyclically working timing generator TG. The start signal SS is obtained from a start gate SG which on its inputs receives the idle signal from the line IC and the stored data signal from the line BO. The idle signal on line IC is generated by a decoder DE which, via the path GS, is connected to the output of the timing generator TG which indicates that the timing generator is in its idle position and is ready to start a working cycle as soon as clock pulses are supplied to the input CP. The idle position is achieved by means of a reset pulse on the path RS after a completed working cycle during which all elements belonging to a character are retransmitted via the output buffer OB. From the decoder DE the idle signal IC as well as periodical read pulses on the line RP and position signals PS are obtained which later are fed to a modifying unit MU together with the timing signal RC. The position signals, each of which indicates a certain position in the working cycle of the timing generator TG, are sensed by the modifying unit MU when a start element is registered in the input buffer IB, which is indicated on the lines BO, TS to the modifying unit. The reset pulse on path RS as well as modifying signals on path MS are emitted to the timing generator TG and by means of the path MS the timing generator can be acted on so that its working cycle is shortened more or less depending on the sensed position mentioned above.

The timing generator TG can, for example, be a cyclic counter which is built of a number of binary counter stages while the decoder DE can be made of a number of AND-gates for the decoding of the instantaneous position of the counter. The counter is preferably divided into two parts, a clock pulse counter and an element counter which is stepped by the clock pulse counter. According to the prerequisite the clock pulse counter has a counting cycle comprising 15 steps being numbered 0–14 while the element counter has a counting cycle comprising 9 steps being numbered 0–8. When the timing generator TG is in the idle position the two counters are in the position 0. The counting starts as soon as start polarity is registered in the input buffer IB whereby a clock pulse on the input CP sets the element counter to position 1. Then a first read pulse is emitted on the line RP and the start polarity is transmitted to the output buffer OB. Then a normal counting operation starts so that the clock pulse counter is set to zero at every fifteenth clock pulse and the element counter is stepped to the next position at the same time as a read pulse is emitted on the line RP. In this manner the element counter will be in the position 1 for the time during which a start element is stored in the output buffer OB and it will be in the position 2–6 while the respective data elements are stored. The stop element, finally, is represented by the positions 7 and 8 but the duration of the position 8 is limited in such a way that a reset pulse is sent to the timing generator TG on line RS when the clock pulse counter is in position 8, whereby the clock pulse counter and the element counter both are set to zero. This corresponds to a nominal stop element length of 1.6 unit intervals. The control gate CG can be realized simply, for example, by means of an OR-gate followed by an AND-gate having two inputs each. A line SS is connected to one of the inputs of the OR-gate and to the other input, which shall be inverting, the line IC is connected. The output of the OR-gate is connected to one of the inputs of the AND-gate. The second input of the latter is connected to the path RC and its ouput is connected to the output of the clock pulse output CP. The function will be that the AND-gate passes pulses from the path RC to the output CP in the presence of a start signal on the line SS or in the absence of an idle signal on the line IC. The start gate SG is an AND-gate which emits a start signal to the line SS when two input conditions are fulfilled, an idle signal on the line IC and a start polarity on the line BO. According to the embodiment, the input buffer IB and the output buffer OB each have the storage capacity of one bit and each one can be a bistable flip-flop which is set to the 1-position or the 0-position depending on whether the data input (IS, BO) presents start polarity or stop polarity at the occurrence of a pulse on the trigger input (TS, RP). Regarding the modifying unit MU, reference is made to FIGS. 4 and 5 which show two alternative means for generating modifying signals to the different counter stages in the timing generator TG.

Figure 4:
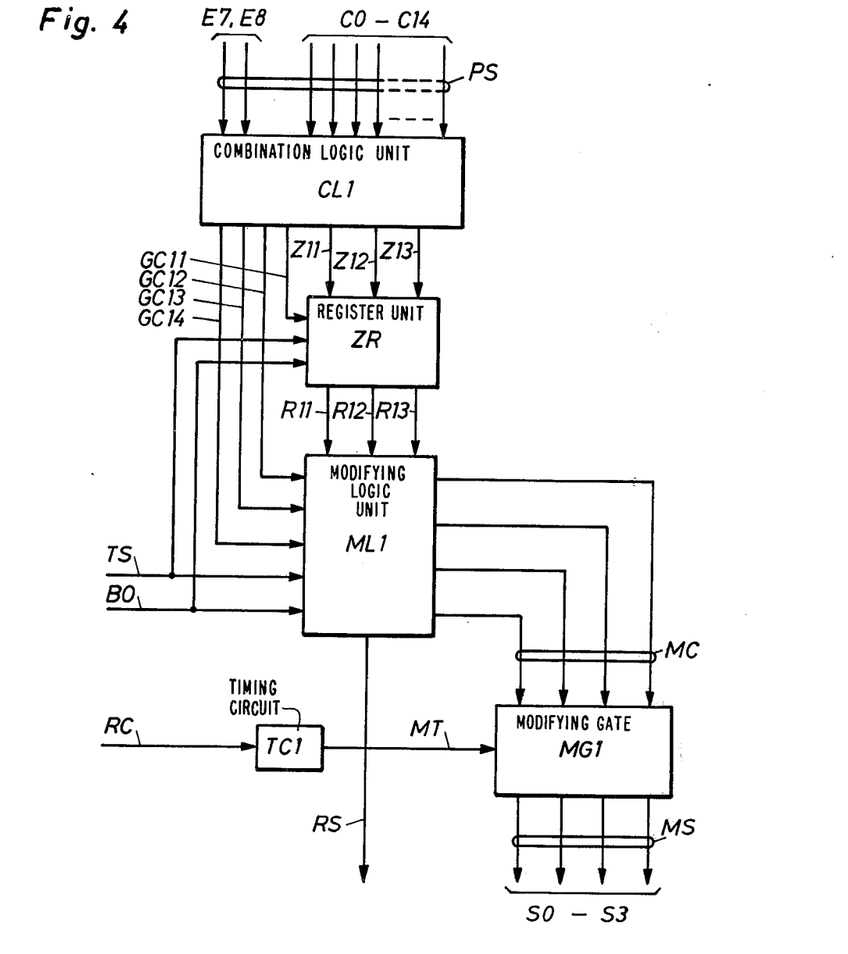
FIGS. 4 and 5 are two schematic diagrams showing alternative inplementations of one of the function blocks in FIG. 3.

According to FIG. 4, the modifying unit MU contains a combination logic unit CL1 for generating gate signals corresponding to determined positions of the timing generator TG, a register unit ZR for the temporary storage of control conditions and a modifying logic unit ML1 for generating reset pulses and modifying signals fed to the timing generator TG by the aid of said control conditions. The modifying signals are fed through a modifying gate MG1 which is triggered by a timing circuit TC1. According to the above the timing generator TG comprises a clock pulse counter and an element counter. The position signals PS then comprise the signals C0–C14 which indicate all positions of the clock pulse counter and the signals E7, E8 which indicate the last two positions of the element counter. The combination logic unit CL1 contains gates by means of which gate signals having various time positions and durations are formed. The purpose of the gate signals GC11–GC14 is to activate the register unit ZR and the modifying logic ML1, respectively, at determined positions of the timing generator TG. The purpose of the gate signals Z11–Z13 is to define three zones for the previously mentioned time distance between the read pulse RP belonging to the stop element of a character being retransmitted and the indication signal IS belonging to the start element of the next detected character. The register unit ZR contains three storage cells corresponding to the three gate signals Z11, Z12 and Z13. Depending on whether any one of these gate signals is activated a registration is effected in the corresponding storage cell on the simultaneous appearance of the gate signal GC11, the element timing signal TS and the data signal BO, implying that a start element has been stored in the input buffer IB. The state of the respective storage cell is indicated by the three outputs R11–R13 which are connected to the modifying logic ML1. Furthermore, this logic receives the element timing signal TS, the data signal BO and the gate signals GC12–GC14. Like the combination logic unit CL1, the modifying logic unit ML1 only contains ordinary gate circuits which, according to a chosen decision algorithm, emit reset pulses on the output RS as well as modifying signals on the output MC. By means of the modifying gate MG1 the modifying signals are fed onwards to path MS at the appearance of a trigger pulse on the input MT from the timing circuit TC1, which in its turn receives, on path RC, the same timing signals as are supplied to the timing generator TG. The purpose of the timing circuit TC1 is to generate trigger pulses MT which are so much delayed in relation to the timing signals RC that the modifying signals MS do not collide with the normal stepping of the timing generator TG. The modifying signals MS are fed to the clock pulse counter section of the timing generator TG. As the clock pulse counter has a counting cycle comprising 15 positions it can be made as a binary counter with four bistable flip-flops. In order to achieve the desired control of the clock pulse counter it is necessary to supply set pulses to each of the four flip-flops which has been symbolized with the designations S0–S3 on the output from the modifying gate MG1.

Figure 6:
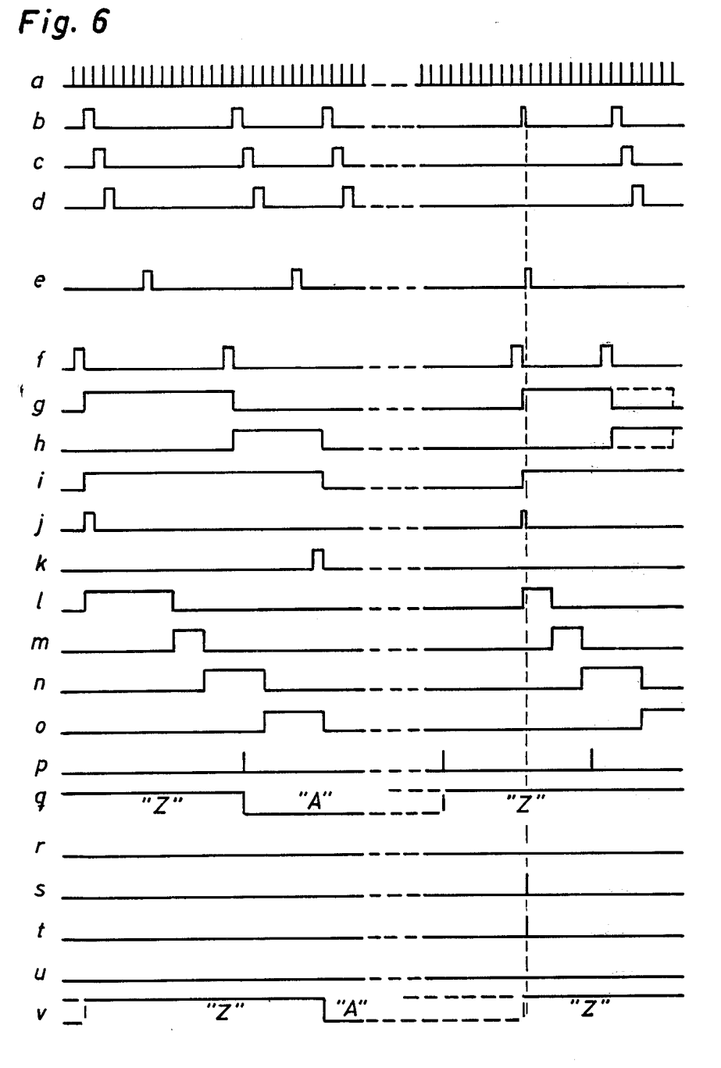
FIGS. 6 and 7 are two time diagrams relating to the application example in FIG. 3 for each of the implementations.
Figure 8:
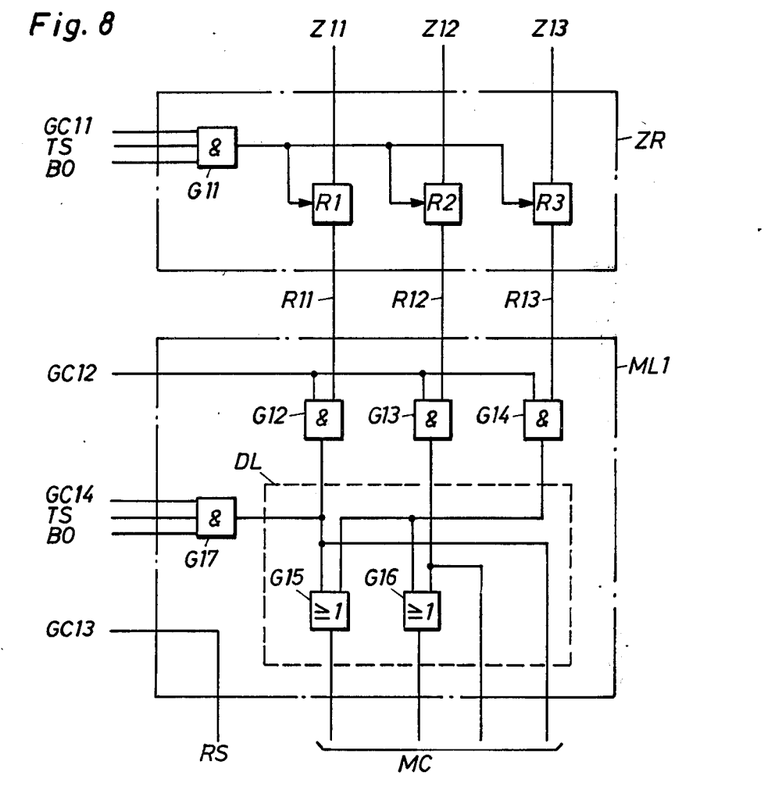
FIGS. 8 and 9 are two circuit diagrams showing details of FIG. 6 and FIG. 7; respectively.

The working method of the apparatus according to FIG. 4 is best described by means of the time diagram FIG. 6 and the circuit diagram FIG. 8. The pulse train in line a in FIG. 6 represents the timing signals which are supplied on path RC. In the lines b–d the position signals C0–C2 are shown, in line e the position signal C6 and in line f the position signal C14. The position signals E7 and E8 are shown in the lines g and h. In the lines i–o the gate signals formed by the combination logic unit CL1 are shown, i.e. in the order GC11, GC12, GC,13, GC14, Z11, Z12 and Z13. Line p shows the element timing signal TS and line q the data signal BO. In lines r–u the modifying signals on path MS are shown and in line v finally the regenerated data signal on path RO is shown. The gate signal GC11, as appears from line i, has a duration which is the sum of the durations of the position signals E7 and E8 in the lines g and h and can, therefore, be formed by means of an OR-circuit having two inputs for the two position signals E7 and E8. The gate signal GC12 in line j appears during clock pulse position 0 in element position 7 and can, consequently, be formed by means of an AND-gate for the position signals C0 and E7. The gate signal GC13 in line k appears during clock pulse position 8 in element position 8 and is formed in a way similar to that of gate signal GC12. The gate signal GC14 in line l appears during clock pulse positions 0–8 in element position 7 and can be formed by means of a gate combination consisting of an OR-gate having nine inputs for the position signals C0–C8 and an AND-gate with two inputs where one of the inputs is connected to the output of the OR-gate and the other input is connected to the position signal E7. The gate signal Z11 in line m, which appears during clock pulse positions 9–11 in element position E7, as well as the gate signal Z13 in line o which appears during clock pulse positions 3–8 in element position 8 can be formed in a way similar to that of gate signal GC14. The gate signal Z12 in line n, however, which has a duration corresponding to the sum of the clock pulse positions 12–14 in element position 7 and 0–2 in element position 8, requires a gate system consisting of two gate combinations similar to those which were used for the gate signal GC14 followed by an OR-gate. FIG. 8 shows an example of how the units ZR and ML1 can be built. The register unit contains three storage cells R1–R3 and a write gate G11, which together form a sensing device to register the counting position of the timing generator TG as indicated by the gate signals Z11–Z13 when the three gate conditions GC11, TS, BO are fulfilled, i.e. on the occurrence of a start element during anyone of the element positions 7–8. The modifying logic ML1 contains three input gates G12–G14 for transferring the indications on the lines R11–R13 to a decision logic DL on the occurrence of a gate signal on the input GC12. According to the chosen decision algorithm, the decision logic DL only requires two OR-gates G15, G16 in order to produce the desired modifying signals on the output MC. The circuit diagram also shows a gate G17, the function of which will be described below.

The situation which is illustrated by the first part of the timing diagram (FIG. 6) is that a character is being retransmitted and the timing generator TG is in clock pulse position 13, element position 6. It is assumed that no registration has been made in the register unit ZR. The signal state "Z" in line q represents stop polarity of the data signal which is stored in the input buffer IB and the duration corresponds to the length of the stop element which has been detected by the detector unit DU. The retransmission of the stop element is started, as is shown in line v, when the timing generator TG shifts to element position 7, whereby the signal state "Z" is shifted into the output buffer OB. When the detector units has detected a new start element a first timing signal is emitted on line TS to the regenerator unit RU at the same time as start polarity is indicated on line IS, whereby the signal state "A" is registered in the input buffer IB. As this registration occurs within element position 8 the gate condition GC11 is activated and hence a registration is initiated also in the register unit ZR. Then the storage cell R2 is selected in correspondence to the gate signal Z12 (line n in FIG. 6) and a corresponding control condition becomes available on the output R12. The gate signal GC13 according to line k marks the end of a working cycle. The signal is forwarded by the modifying logic ML1 to path RS and the result is that the timing generator TG is reset to the idle position by the next clock pulse CP. According to what has been described in connection with FIG. 3 a new working cycle is now initiated whereby the start polarity, as is shown in line v in FIG. 6, is transferred to the output buffer OB by means of a read pulse on the line RP.

The AND-gates G12–G14 in the modifying logic ML1 have one of their inputs connected to each one of the inputs R11–R13. The second input to each of the three AND-gates is connected to the common input GC12. By means of the decision logic DL, the outputs of the AND-gates are connected to the output MC in such a way that the desired modifying signals are formed when the respective AND-gate is activated i.e. on the simultaneous appearance of a gate signal on the line GC12 (line j) and a control condition on either of the inputs R11–R12. The modifying signals can be chosen, for example, in such a way that the control condition R11 leads to a shift to position 9 of the clock pulse counter of the timing generator while the control condition R12 leads to a shift to position 6 and the control condition R13 leads to a shift to position 3. According to the example, the control condition R12 is activated and hence, when the modifying gate MG1 is activated by a trigger pulse on the input MT, the control signal being emitted on the output MS will, according to lines r–u in FIG. 6, have the composition: S0=0, S1=1, S2=1, S3=0. According to line b in FIG. 6 it is shown how the clock pulse position 0 is interrupted in this manner to be, subsequently, replaced by position 6 according to line e. As it appears from line g, element position 7 will be shortened by six clock pulse intervals and, according to line h, element position 8 is moved up correspondingly. The stop element ("Z"-state) shown at the end of line v will, consequently, be shortened by six clock pulse intervals which corresponds to 0.4 unit intervals. In other words, the stop element being retransmitted on path RP will have a length of 1.2 unit intervals instead of the nominal length of 1.6 unit intervals.

According to the above the stop element shown at the beginning of line v in FIG. 6 obtained the nominal length as the working cycle of the timing generator TG was completed. The same would have been the case even if the signal state "A" shown in line q had been registered in the input buffer IB as early as during clock pulse position 9 in element position 7. The storage capacity of the input buffer would then have been maximally utilized. In extreme cases, however, it may be that the start polarity is indicated earlier than during clock pulse position 9. In such cases it is necessary to shorten the working cycle in progress to the corresponding degree in order not to exceed the storage capacity of the input buffer IB. For this purpose the modifying logic is provided with an AND-gate G17 to which the three signals GC14, TS and BO are supplied. The output of the gate is connected to the decision logic DL in the same way as the AND-gate R12. Consequently, if "A"-state is registered in the input buffer IB during any one of the clock pulse positions 0–8 in element position 7 the clock pulse counter will immediately be shifted to position 9 which implies that the stop element which is being retransmitted will be shortened so that the remaining length after the shortening instant becomes one unit interval.

Figure 5:
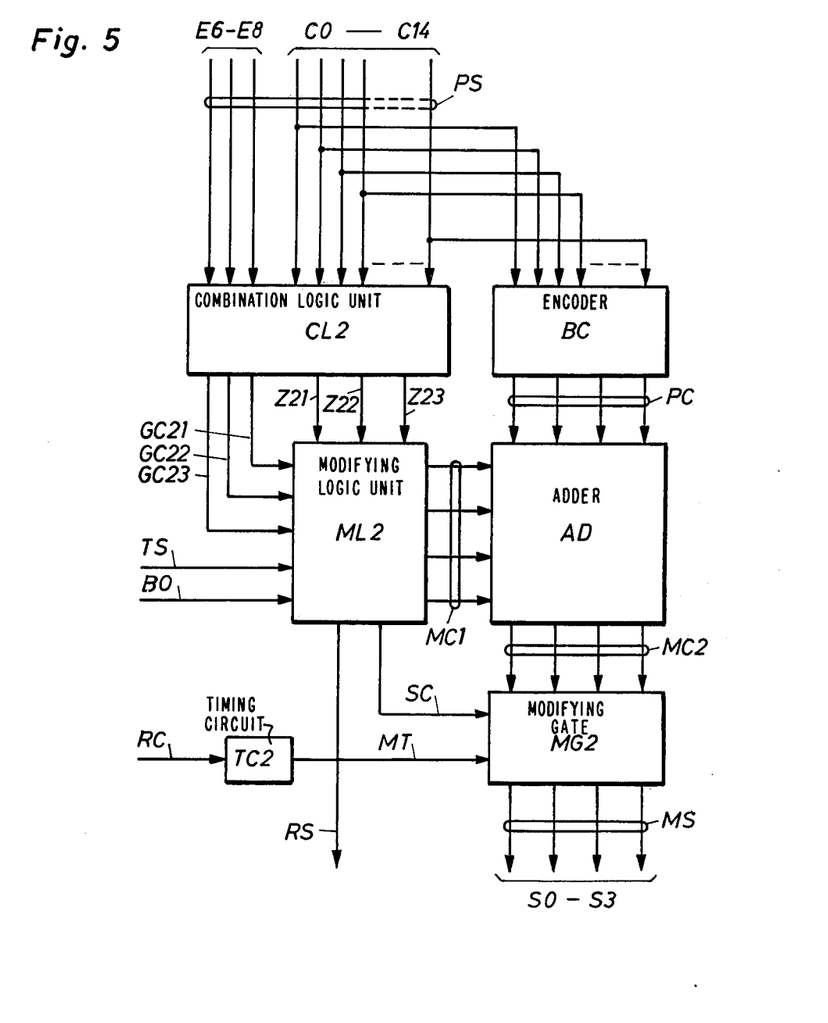

In the modifying apparatus MU according to FIG. 5 four units are included which have the same function as the corresponding units in the apparatus according to FIG. 4, namely a combination logic unit CL2, a modifying logic unit ML2, a modifying gate MG2 and a timing circuit TC2. Another two units have been added, namely an encoder BC for conversion of the position signals C0–C14 into binary code and an adder AD for translation of the modifying signals from the modifying logic ML2 to the timing generator TG depending on the position being indicated by the binary code from the encoder BC. The register unit ZR in FIG. 4 has no correspondence here. The gate signals GC21–GC23 and Z21–Z23 being emitted by the combination logic unit CL2 are used in the modifying logic unit ML2 in a similar way as the corresponding signals in FIG. 4. The modifying signals being emitted on path MC, however, cannot be used directly for the adjustment of the timing generator TG but must at first be added to the position code PC in the adder AD being obtained from the unit BC before they are fed via path MC2 to the modifying gate MG2.

Figure 7:
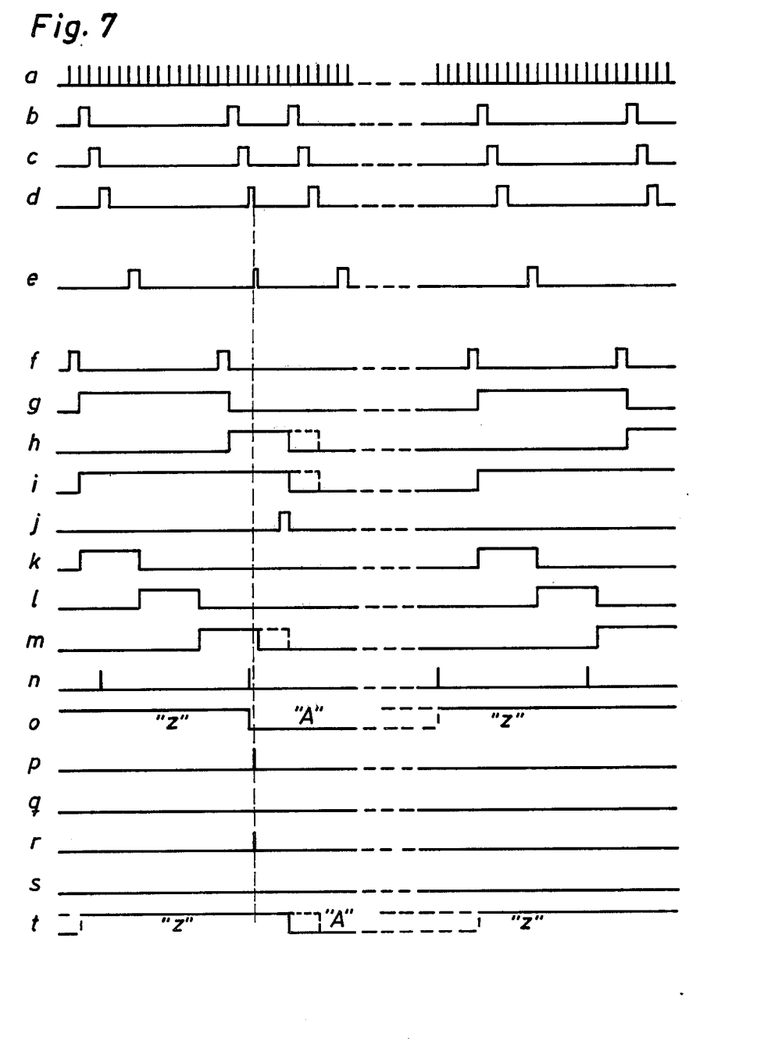
Figure 9:
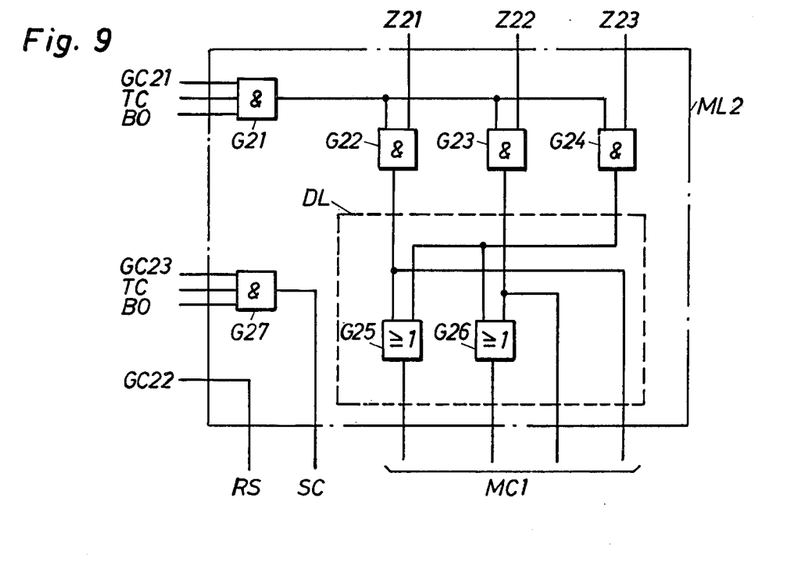

To describe the working method of the apparatus according to FIG. 5 reference is made to the time diagram FIG. 7 and the circuit diagram FIG. 9. As in FIG. 6 the pulse train in line a represents the timing signals on path RC and the pulses in lines b–d represent the position signals C0–C2. Line e shows the position signal C5, line f the position signal C14 and lines g, h the position signals E7, E8. In the lines i–m five of the gate signals from the combination logic unit CL2 are shown, namely GC21, GC22, Z21, Z22 and Z23. The gate signal GC23 is not shown in the time diagram. Line n shows the element timing signal TS and line o the data signal BO. In lines p–s the modifying signals on path MS are shown and in line t, finally, the modified data signal on path RO is shown. As it appears from FIG. 7 the gate signal GC21 in line i has a duration which is the sum of the durations of the position signals E7, E8. The gate signal GC22 in line j appears during clock pulse position 8 in element position 8. The gate signal Z21 in line k appears during clock pulse positions 0–5 in element position 7 and the gate signal Z22 in line e during clock pulse positions 6–11 in element position 7. The gate signal Z23 in line m, finally, has a duration corresponding to the sum of the clock pulse positions 12–14 in element position 7 and the clock pulse positions 0–5 in element position 8. The gate signals are formed in a similar way as described in connection with FIG. 6.

FIG. 9 shows how the modifying logic unit ML2 can be implemented. A sensing apparatus for the counting position of the timing generator TG is formed here by the AND-gates G21–G24.

Depending on which of the gate signals Z21–Z23 is activated when the three gate conditions GC21, TS, BO are fulfilled an indication is obtained from the corresponding gate, for example G23, to a decision logic DL. This contains two OR-gates G25, G24 and has, according to the embodiment, the same function as the corresponding unit in FIG. 8. The modifying logic ML2 furthermore contains a gate G27 which will be treated later.

The process described by the first part of the timing diagram in FIG. 7 is the same as for FIG. 6. At the same time as the timing generator TG is stepped forwards to clock pulse position 2 in element position 8 start polarity "A" is registered in the input buffer IB, as appears from line o in FIG. 7. At this moment the gate signals GC21 and Z23 are available and so the AND-gate G24 in the modifying logic ML2 is activated. In a similar way as has been described in connection with FIG. 6 the proper modifying signals are formed by means of the decision logic DL and emitted to the output MC1. In this case the timing generator TG, however, cannot be shifted to a determined position but has to be stepped forwards a determined number of steps.

The decision logic unit DL can, for example, be arranged in such a way that the forwarding will equal 9 steps in correspondence to the gate signal Z21, while the gate signal Z22 corresponds to 6 steps and the gate signal Z23 corresponds to 3 steps. Consequently the modifying logic unit ML2 will emit a modifying signal having the value 3 on path M1 to the adder AD which at the same time receives a position code having the value 2 on path PC. The result will be that a modifying signal having the value 5 is emitted to path MC2. When the modifying gate MG2 is activated by a trigger pulse on the line MT a modifying signal having the composition: S0=1, S1=0, S2=1, S3=0, according to lines p–s, is emitted on path MS and the clock pulse counter in the timing generator TG is shifted to position 5. From the timing diagram it is seen how clock pulse position 2, according to line d, is interrupted and instead is taken over by position 5, according to line c. In this way element position 7 will be shortened by 3 clock pulse intervals and element position 8 will be placed earlier by the same amount, according to lines g and h. Via the modifying logic unit ML2 the gate signal GC22 in clock pulse position 8, element position 8 gives rise to a reset pulse which is transferred to the timing generator TG on path RS which is reset to the idle position by the next clock pulse CP. The stop element shown in the beginning of line t will, consequently, be shortened by 3 clock pulse intervals and it will be retransmitted on path RO with a length of 1.4 unit intervals.

The storage capacity of the input buffer IB is maximally utilized if the start polarity ("A"-state) is registered as early as during clock pulse position 0 in element position 7. The stop element being retransmitting is then shortened to the length of one unit interval. In the case that start polarity should be registered earlier than during element position 7 it is possible to shorten the data element which is being retransmitted instead of shortening the stop element any further. In order to achieve this shortening the modifying logic unit ML2 is provided with an AND-gate G27 which receives the gate signal GC23, the data signal BO and the element timing signal TS. The output of the gate is connected to an output SC to the modifying gate MG2. The function of the AND-gate will be that if start polarity is registered during element position 6 a switch-over signal is emitted on the line SC. This switch-over signal acts upon the modifying gate MG2 in such a way that the timing generator TG is shifted to clock pulse position 9, element position 7 which implies that a stop element having the length of 1.0 unit intervals can be emitted from the output buffer OB. Alternatively, it is possible to let the date element being retransmitted when a start element is registered in the input buffer IB obtain the full length and instead make the stop element shorter than one unit interval. The shortening is effected in a similar way as has been described earlier, the main difference being that it is performed if data element no 1 is registered in the input buffer IB while the timing generator TG is in element position 7. The timing generator is then shifted to clock pulse position 0, element position 1, whereby a start element can be sent with a delay of 1.0 unit intervals.

Figure 10:
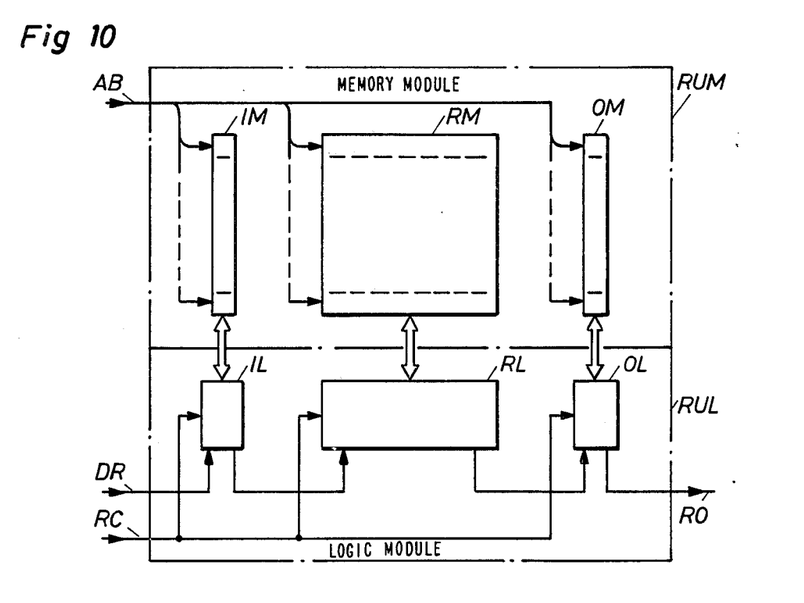
FIG. 10 is a block diagram of a practical implementation of the invention in a TDM system.

In FIG. 10 there is shown, in a very simplified form, how the regeneration unit RU can be implemented in a TDM (time division multiplex) system. According to the embodiment, the unit consists of a logic module RUL containing the parts IL, RL and OL and a memory module containing the parts IM, RM and OM, each of which cooperates with one of the logic parts. From the functional point of view, the combination IL, IM corresponds to the input buffer IB in FIG. 3, the combination OL, OM corresponds to the output buffer OB and the combination RL, RM corresponds to the rest of the units in FIG. 3. The paths DR and RO in FIG. 10 transfer time multiplexed signals representing a large number of incoming and outgoing data channels. The signals arriving on a certain incoming channel are related to a certain outgoing channel and a memory position in the memory RUM is associated with each such channel pair. The memory positions are addressed cyclically by means of address codes arriving on the address bus AB, a storage cell being indicated simultaneously in each of the memory parts IM, RM and OM. The addresses are generated, for example, in the common control unit CC shown in FIG. 1 and they are transferred at the same rate as the timing signals RC. The logic module RUL performs three operations for each memory position being addressed in the memory module RUM. In the first operation a reading is effected from the memory at the same time as the information on path DR is stored in the logic part IL. In the second operation the logic part RL performs a modification of the information being read from the memory part RM depending on the information which is received from the logic part IL. In the third operation, finally, an updating of the memory RUM is made according to the new information being available in the logic module RUL at the same time as an output is obtained on path RO.

We claim:

1. A method for regenerating asynchronous data characters of a given character structure containing data element which arrive on a transmission line time-distorted and at an incoming signalling rate which deviates from a nominal signalling rate, the characters after detection being supplied, at a character rate determined by the arriving elements, to a regeneration device which retransmits the characters to the transmission line at an outgoing signalling rate determined by a clock controlling the regeneration device, said regenerating method comprising the steps of temporarily storing at least one element of each of the supplied characters while the retransmission of the previous character progresses, establishing the time difference between the starting time of each supplied character and the expected completion time for the character retransmitted at the respective starting time, and utilizing the established time difference at a certain instant to shorten the character being retransmitted at said certain instant, the extent of the shortening depending on the magnitude of the time difference in comparison with a given limit value.

2. The method according to claim 1 wherein said shortening is effected during transmission of the character supplied last.

3. The method according to claim 1 wherein said shortening is effected on the character which is being retransmitted as the beginning of said supplied character is sensed.

4. The method according to claim 1 wherein said temporary storing is performed under the control of a timing signal being supplied together with each signal element.

5. The method according to claim 1 comprising temporarily storing information regarding the established time difference for later use.

6. The method according to claim 1 wherein said shortening occurs coincident with the establishing of the time difference.

7. Apparatus for regenerating asynchronous data characters of a given character structure containing data elements which arrive on an incoming transmission line time-distorted and at an incoming signalling rate which deviates from a nominal signalling rate, the characters thereafter being supplied, at a character rate determined by the arriving elements, to an outgoing transmission line at an outgoing signalling rate determined by a clock controlling the regeneration device, said apparatus comprising detector means connected to the incoming transmission line for detecting the characters;

a buffer means connected to the detector unit for temporarily storing at least one element of each of the data characters while the retransmission of the previous character is in progress;

a timing generator means controlled by the clock, said timing generator means having a cyclic counter means for performing counting cycles and a decoder means for generating position signals associated with determined counter positions;

a reading means having inputs connected to said buffer means and to the timing generator means and having output means connected to the outgoing transmission line, the character elements being read from said buffer means and transmitted onto the outgoing transmission line in determined counter positions after a certain storage time;

sensing means connected to said buffer means and timing generator means for establishing, by means of the position signals, the counter position of said timing generator means in response to the starting time of a supplied character;

a decision means connected to said sensing means for emitting, at a certain instant, modifying signals which depend on the established counter position; and a modifying means connected to said decision means and to said timing generator means for shortening the counting cycle and consequently the duration of the retransmitted character, said modifying means having means for changing the counter position of said cyclic counter means to a higher counter position in correspondence with the modifying signals.

* * * * *